Figure 1:
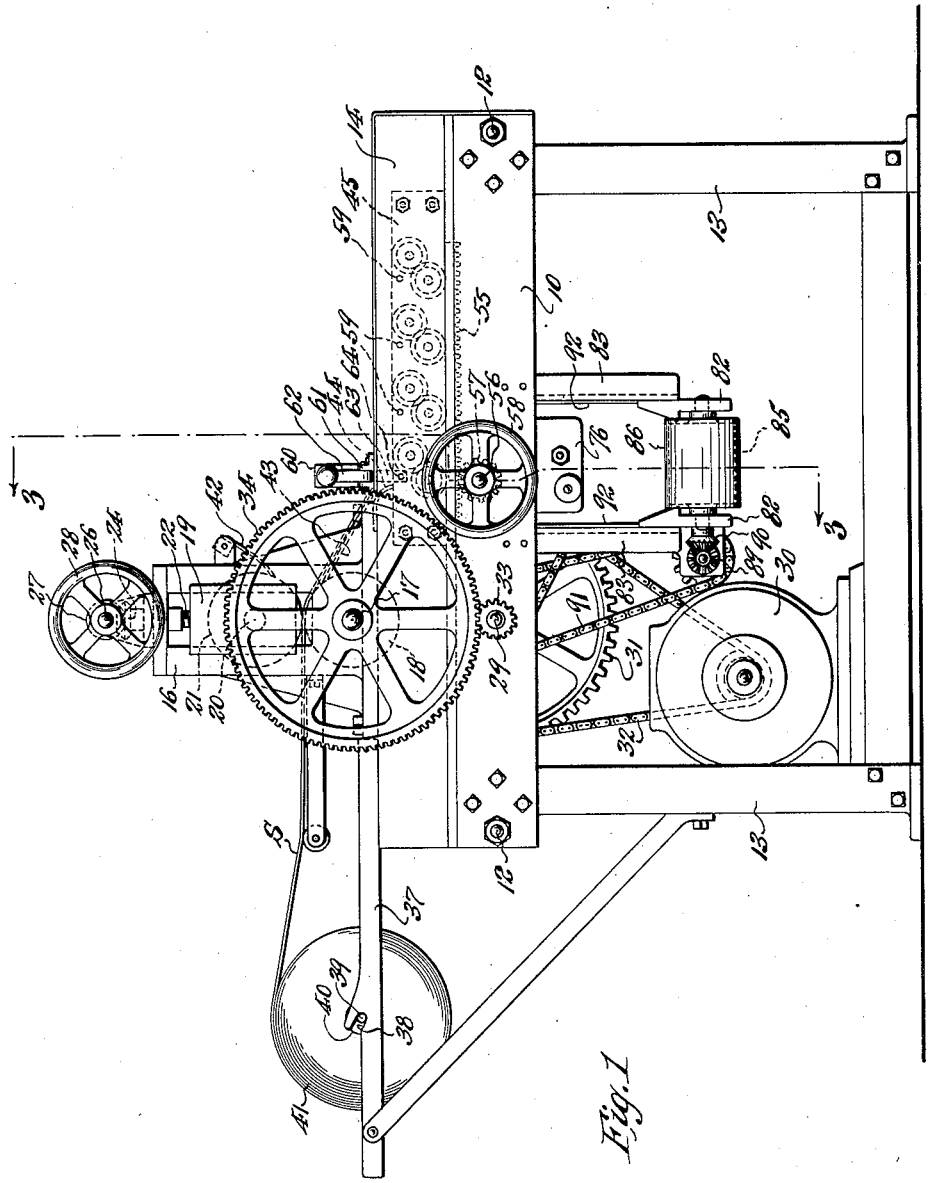

Nov. 5, 1940.          C. AMBRETTE                2,220,438
                    NOODLE CUTTING MACHINE
                    Filed March 9, 1940        4 Sheets-Sheet 1

INVENTOR.
Conrad Ambrette,
BY George D. Richards
                    ATTORNEY.

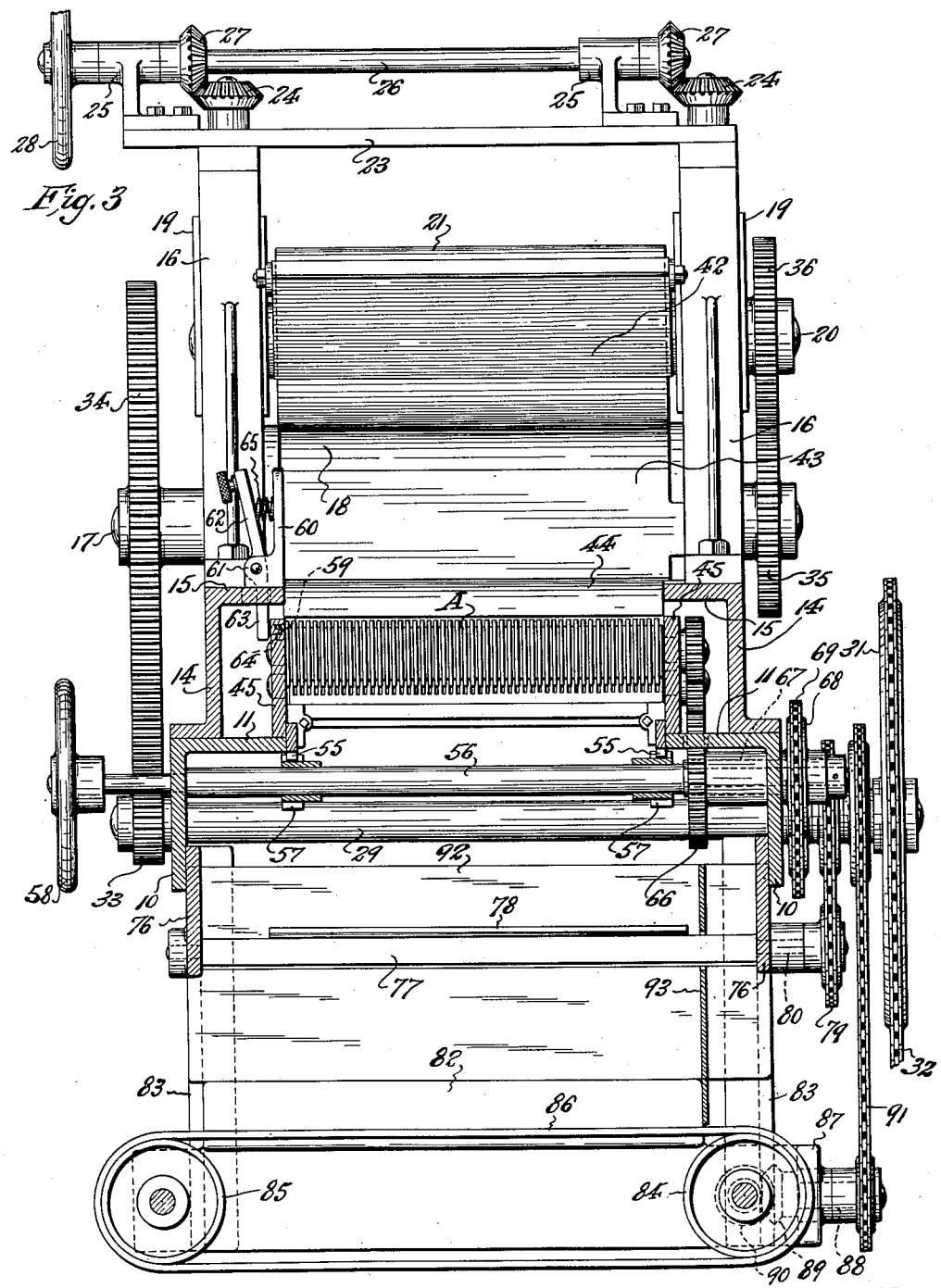

Nov. 5, 1940.   C. AMBRETTE   2,220,438
NOODLE CUTTING MACHINE
Filed March 9, 1940   4 Sheets-Sheet 4
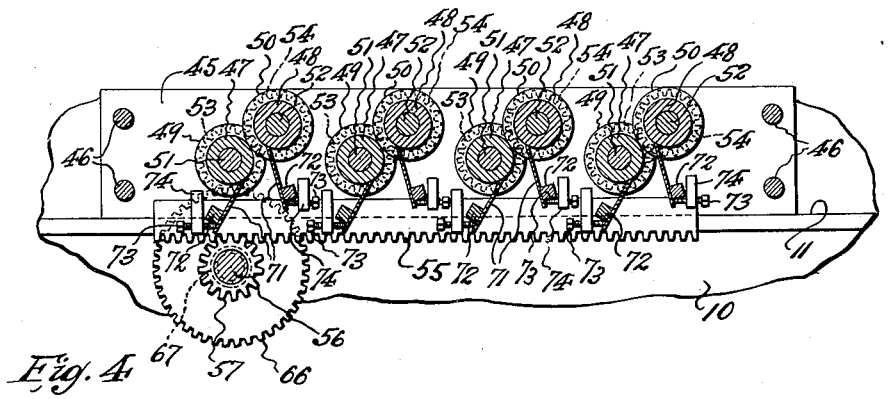
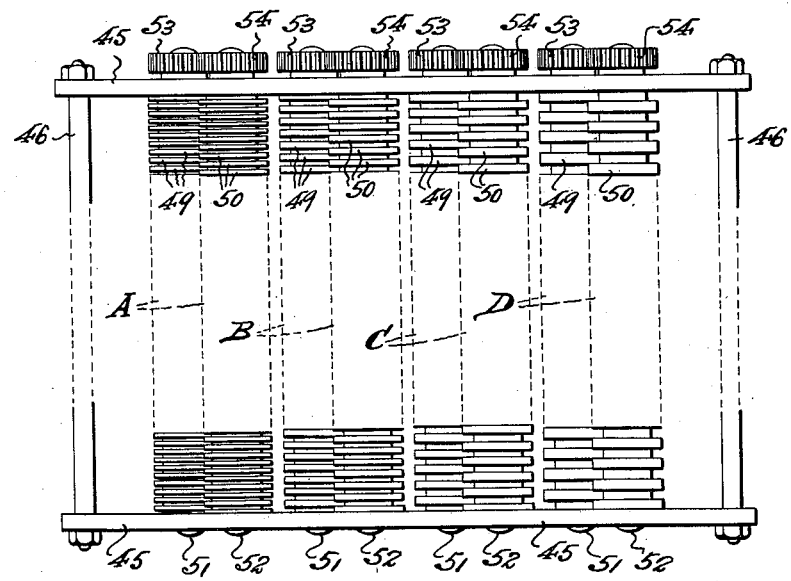
INVENTOR.
Conrad Ambrette,
BY George D. Richards
ATTORNEY.

Patented Nov. 5, 1940

2,220,438

UNITED STATES PATENT OFFICE 2,220,438

NOODLE CUTTING MACHINE

Conrad Ambrette, Brooklyn, N. Y., assignor to Consolidated Macaroni Machine Corporation, Brooklyn, N. Y., a corporation of New York Application March 9, 1940, Serial No. 323,095

8 Claims. (Cl. 107—22)

This invention relates to improvements in mechanism for cutting noodles; and the invention has reference, more particularly, to a novel machine for such purpose which is equipped with selective cutting mechanism adjustably movable relative to the dough feeding means of the machine, whereby the dough fed to the cutting mechanism may be cut to form noodle strips of desired width sizes.

Alimentary paste products known to the trade as noodles comprise flat ribbon-like strips of dough. The trade demands such noodle products in various width sizes; as, for example, in width sizes of $\frac{1}{16}$th inch, $\frac{1}{8}$th inch, $\frac{1}{4}$ inch, $\frac{1}{2}$ inch, and, in some instances, of even greater width.

It is an object of this invention to provide a noodle cutting machine having a dough feeding means and a novel cutting means cooperative therewith, wherein said cutting means is provided with a series of cutter roll sets respectively adapted to cut the dough into respectively different widths, together with means for selectively bringing the cutter roll sets into operative relation to the dough feeding means and into operatively engaged relation to power transmission means of the machine, whereby the selected cutter roll set is actuated in cooperation with the dough feeding means.

Another object of this invention is to provide, in a noodle cutting machine having a dough feeding means, a cutter roll carriage having a plurality of spaced cutter roll sets of different sizes, said carriage being slidably movable in the machine framework relative to the dough feeding means, whereby a selected cutter roll set may be operatively related both to the dough feeding means and to means for driving the selected cutter roll set; means being provided for manually moving the carriage to selected cutter roll set adjusting position; and means being further provided for releasably locking the carriage in selected cutter roll set adjusting position.

A further object of the invention is to provide novel means for receiving the cut noodle strips from the operative cutter roll set, severing the same to desired length, and thereupon discharging the same outwardly from the machine.

Other objects of this invention, not at this time more particularly enumerated, will be understood from the following detailed description of the same.

Figure 2:
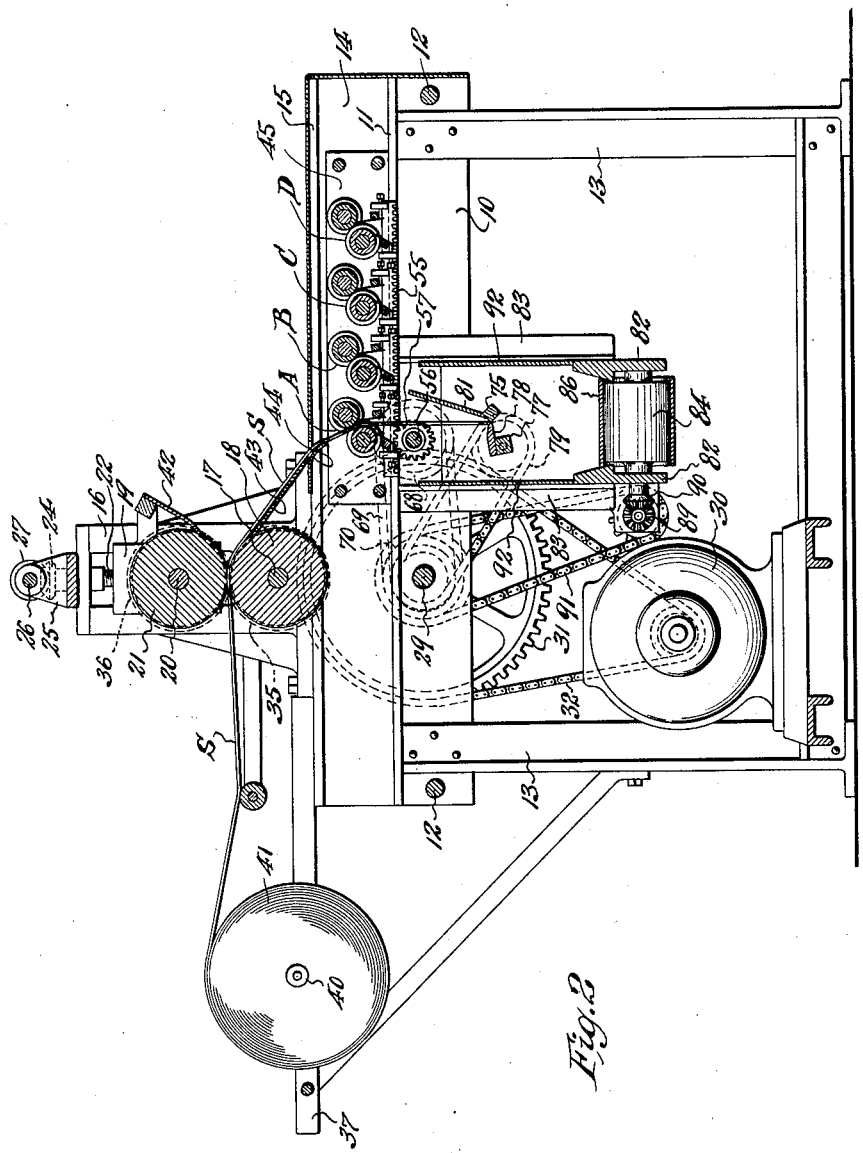

An illustrative embodiment of this invention is shown in the accompanying drawings, in which:

Fig. 1 is a side elevation of the noodle cutting machine made according to this invention; Fig. 2 is a longitudinal vertical section through said machine; Fig. 3 is a transverse vertical section, taken on line 3—3, in Fig. 1, but drawn on an enlarged scale; Fig. 4 is an enlarged longitudinal sectional view of the cutter roll carriage; and Fig. 5 is a plan view of the cutter roll carriage.

Referring to said drawings, the machine framework comprises a pair of laterally spaced, longitudinally extending side frame members 10 formed to provide inwardly and horizontally projecting slideway flanges 11, said side frame members 10 being secured together in spaced relation by tie-bolts 12 connected to and between corresponding end portions thereof. Said side frame members 10 are carried by suitably arranged leg members 13. Extending along said side frame members 10, to rise therefrom, are auxiliary side frame members 14, the same having inwardly and horizontally projecting top flanges 15 spaced above the slideway flanges 11 of said side members 10.

Affixed upon the top flanges 15 of said auxiliary side frame members 14, at suitable locations intermediate the ends thereof, and so as to rise therefrom in transversely opposed relation, are bearing standards 16. Journaled in and between the lower portions of said bearing standards 16 is the shaft 17 of a fixed transverse lower dough feed roll 18. Vertically slidable in upper portions of said bearing standards 16 are adjustable bearing blocks 19, and journaled in and between said bearing blocks is the shaft 20 of an adjustable transverse upper dough feed roll 21, which is thus vertically opposed to said lower dough feed roll 18 so as to be capable of adjustment toward and from the latter, whereby to determine the desired thickness of noodle dough sheet to be fed by said rolls to the cutting mechanism of the machine.

Means for manually adjusting the upper feed roll 21 relative to the lower feed roll 18 is provided in cooperation with the movable bearing blocks 19. This means comprises rotatable jack screws 22 which are respectively threaded into the respective bearing blocks 19, with their upper end portions journaled in and extending above the top ends of said bearing standards 16, and disposed to project through a bridge plate 23 affixed across and between the latter. Affixed upon the upper ends of said jack screws 22 are bevel pinions 24. Mounted on the bridge plate 23 are bearing brackets 25, and journaled in and between said bearing brackets is a shaft 26 upon which are fixed drive bevel pinions 27 to operatively mesh with said jack screw pinions 24. Affixed upon an external end of said shaft 26 is a hand wheel 28 by means of which the shaft may be manually actuated to transmit, through the intermediate gearing and jack screws, movement to the bearing blocks 19 to raise or lower the same as the case may be, whereby to adjust the upper feed roll relative to the lower feed roll for attainment of desired predetermined spaced relation of said rolls.

Journaled in and between the side frame members 10, at a suitable location intermediate the ends thereof, is the main drive shaft 29 of the machine. Said drive shaft may be suitably driven from any suitable source of power, but preferably is driven from and by an electric motor 30 suitably mounted beneath the side frame structure in connection with the machine frame work. Fixed on said drive shaft 29 is a drive sprocket 31 of suitable size, which is driven by a transmission chain 32 from a sprocket operated by the motor shaft.

Said dough feed rolls 18—21 are driven from said main drive shaft 29, and to this end a drive pinion 33 is fixed on said drive shaft 29 to mesh with a drive gear wheel 34 which is fixed on the shaft 17 of the lower feed roll 18 so as to drive the latter. The shaft 20 of the upper feed roll 21 is driven from the shaft 17 of said lower feed roll by intermediate meshing gears 35 and 36 respectively fixed on the shaft 17 and the shaft 20.

Suitably supported from the machine framework, to project from an end thereof, are laterally spaced supporting brackets 37 having bearing notches 38. These brackets serve to rotatably support the journals 39 of a carrying roll 40 upon which is wound a length of sheeted noodle dough 41 desired to be fed by the feed rolls 18—21 to the needle cutting mechanism of the machine.

From the supply of sheeted dough 41 the dough sheet S is led to and passed between the feed rolls 18—21 so as to be gripped and advanced by the latter, while at the same time, due to the adjusted relatively spaced setting of said feed rolls, the dough sheet is also reduced to a desired predetermined thickness preparatory to being cut into noodle forming strips of desired width. In order to detach the dough sheet issuing from between the rolls 18—21, should the same accidentally adhere to one or the other thereof, suitably supported stripper plates 42 and 43 are provided to respectively cooperate with the upper roll 21 and the lower roll 18. The stripper plate 43 inclines downwardly away from the discharge side of the rolls so as to also guide the issuing dough sheet to and over a fixed guide plate 44 beneath which a selected cutter roll set desired to be used is operatively located.

The selective cutting mechanism comprises a carriage formed by a pair of laterally opposed and spaced side plates 45 which are joined together by transverse tie-rods 46 connected to and between corresponding end portions thereof. The lower edges of said carriage side plates 45 are slidably supported upon the respective inner marginal portions of slideway flanges 11 of the side frame members 10, so that the carriage may be moved longitudinally of the machine, and relative to the point of delivery of the dough sheet issued by the feed rolls 18—21 and over the guide plate 44.

Mounted to extend transversely between said side plates 45 so as to be carried by the carriage are a plurality of sets of cutter rolls, indicated in the drawings respectively by the reference characters A, B, C and D. Said cutter roll sets are longitudinally spaced apart along the length of the carriage. Each set of cutter rolls is sized to cut the dough sheet into strips of predetermined width size, e. g. the set A being sized to cut strips of 1/16th inch in width, the set B to 1/8th inch width, the set C to 1/4 inch width and the set D to 1/2 inch width. These dimensions are cited for purposes of illustration, and it will be understood that varying dimensions of different measurement may be employed if desired. Furthermore, while the drawings show but four sets of cutter rolls, it will be obvious that more or less than four sets may be provided if desired.

Each set of cutter rolls comprises a pair of opposed cooperating rolls comprising, a forward cutter roll 47 and a somewhat relatively elevated rearward cutter roll 48 respectively provided with annular cutter blade portions 49 and 50 adapted to interlap one another. Said cutter blade portions are of such width and relative spacing as to correspond to the width of the noodle strip desired to be cut thereby. The cutter rolls 47 and 48 are respectively mounted on shafts 51 and 52, the ends of which are journaled in the carriage side plates 45. Fixed on corresponding ends of the shafts 51 and 52 are intermeshing gears 53 and 54, whereby the cutter rolls may be relatively rotated in opposite directions, as e. g. the cutter roll 47 in clockwise direction and the cutter roll 48 in anticlockwise direction.

Means for advancing and retracting the cutter roll carriage at will, to operatively dispose a selected pair of cutter rolls for reception of the dough sheet issued by the feed rolls 18—21, comprises, rack bar means 55 affixed to one or both carriage side plates 45 to depend therefrom inwardly of the slideway flanges 11 of the machine side frame members 10. Journaled in and between said side frame members 10 is a transverse shaft 56 upon which are fixed one or more pinions 57 to operatively mesh with said rack bar means 55. Affixed upon an external end of said shaft 56 is a hand wheel 58 by means of which the shaft may be manually turned to transmit, through the pinion and rack bar means, adjusting movements to the cutter roll carriage, whereby to bring a selected set of cutter rolls into operative dough sheet receiving position.

Means for locking the cutter roll carriage against displacement from a given adjusted position disposing a selected set of cutter rolls in operative dough sheet receiving position comprises, a series of lock pin receiving openings 59 provided in a carriage side plate 45 and respectively located for effective relation to the respective cutter roll sets. Fixed upon a top flange 15 of an auxiliary side frame member 14 is an upstanding supporting piece 60 having laterally spaced bearing ears 61. Pivotally supported by said bearing ears 61 is a releasable lock lever, the upwardly projecting arm 62 of which constitutes a manipulating arm opposed to said supporting piece, and the lower arm 63 of which constitutes a lock arm provided, adjacent to its free end with a projecting lock pin 64 adapted to be entered in a lock pin receiving opening 59 which is opposed thereto by desired adjustment of the cutter roll carriage. Said top flange 15 of said auxiliary side frame 14 is suitably cut away to permit said lock arm 63 to project downwardly therethrough adjacent to the exterior face of the carriage side plate in which the lock pin receiving openings are provided. Compression spring 75 means 65 is arranged between the supporting piece 60 and the manipulating arm 62, whereby the lock lever is yieldably maintained in locking relation to the cutter roll carriage.

Means for operatively driving the effectively located set of cutter rolls from the main drive shaft 29 comprises, a transmission gear 66 with which the drive gear 53 of the forward cutter roll 47 of the selected set of cutter rolls is brought into mesh by the adjusting movement of the carriage effective to bring said selected set of cutter rolls into operative position. Said transmission gear 66 is fixed on the inner end of a drive sleeve or hollow shaft 67 which is rotatably mounted on an end portion of the transverse shaft 56. Fixed on the outer end of said sleeve is a sprocket 68 driven by a chain 69 from a drive sprocket 70 affixed upon said main drive shaft 29.

Cooperative with each cutter roll of the several sets thereof are stripper comb plates 71 having stripper fingers to enter between the cutter blade portions thereof so as to bear against the roll surface and strip away therefrom any cut dough tending to adhere thereto. Said stripper comb plates 71 are carried by rocker bars 72 journaled in and between the carriage side plates 45, and the stripper fingers of said comb plates are held in tensionally bearing relation to the cutter rolls served thereby by means of adjustable thrust screws 73 which are threaded through supporting lugs 74 affixed to and projecting from the inner sides of said carriage side plates 45. Said thrust screws 73 are disposed to bear against the lower marginal portions of the comb plates so as to so swing the same, as pivoted by the carrying rocker bars 72, that the extremities of the stripper fingers are in turn swung toward and pressed against the cutter rolls.

Means for severing the noodle strips issuing from an operative cutter roll set is located below the working position of the latter. This means comprises a stationary cutter bar 75 supported by and to extend between bearing hangers 76 which are secured to and dependent from the side frame members 10 of the machine. Cooperative with said stationary cutter bar 75 is a rotary cutter member 77 journaled in and between said bearing hangers 76. Affixed to said rotary cutter member 77 is a cutter blade 78 adapted during revolution thereof to make shearing engagement with said stationary cutter bar 75. Said rotary cutter member 77 is driven by a chain and sprocket transmission 79 connected between said drive shaft 29 and a journal extension 80 of said cutter member 77. A guide plate 81 is arranged to extend to the noodle strip severing means from a point adjacently below the operative cutter roll set.

Means is provided for discharging the severed noodle strips outwardly from the machine. This means comprises a receiving endless conveyer running transversely of the machine so as to discharge the noodles from a side of the machine. Said conveyer comprises a pair of spaced side guide plates 82 suspended by hanger bars 83 from the side frame members 10 of the machine. Journaled in and between said pair of side guide plates 82, at one end thereof, is a driven pulley 84, and journaled in like manner in and between said pair of side guide plates, at the other end thereof, is an idler pulley 85. Running over and between said pulleys is an endless conveyer belt 86. The means for driving the conveyer includes a bearing bracket 87 in which is journaled a transmission shaft 88 operative to drive the pulley 83 through meshing bevel gears 89 and 90. Said transmission shaft 88 is driven by a chain and sprocket transmission 91 connected between said drive shaft 29 and said transmission shaft 88. Supported by said hanger bars 83 are partition side walls 92, between which is arranged an end wall 93, thus providing a severed noodle receiving compartment the bottom of which is formed by the effective course of the conveyer belt 86.

From the above description it will be understood that this invention provides a very efficient noodle cutting machine readily and quickly adaptable to cut noodles in various desired strip widths. I am aware that many changes may be made in the construction and details of the same, without departing from the scope of the invention as defined by the following claims. It is therefore intended that the constructions described and shown are to be interpreted as illustrative and not in a limiting sense.

I claim:

1. In a noodle cutting machine, a framework, dough sheet feed rolls mounted in connection with said framework, a cutter roll carriage slidably supported in connection with said framework, longitudinally spaced sets of cutter rolls of respectively different cutting sizes operatively supported by said carriage and selectively disposable, by moving said carriage, in position to receive and operate upon a dough sheet fed thereto by said feed rolls, and releasable means for holding said carriage against displacement when a selected set of cutter rolls is thus operatively related to said feed rolls.

2. In a noodle cutting machine, a framework, dough sheet feed rolls mounted in connection with said framework, a cutter roll carriage slidably supported in connection with said framework, longitudinally spaced sets of cutter rolls of respectively different cutting sizes operatively supported by said carriage and selectively disposable, by moving said carriage, in position to receive and operate upon a dough sheet fed thereto by said feed rolls, releasable means for holding said carriage against displacement when a selected set of cutter rolls is thus operatively related to said feed rolls, and means located beneath the position of an operatively disposed cutter roll set effective to sever the noodle strips issuing from the latter into desired lengths.

3. In a noodle cutting machine, a framework, dough sheet feed rolls mounted in connection with said framework, a cutter roll carriage slidably supported in connection with said framework, longitudinally spaced sets of cutter rolls of respectively different cutting sizes operatively supported by said carriage and selectively disposable, by moving said carriage, in position to receive and operate upon a dough sheet fed thereto by said feed rolls, releasable means for holding said carriage against displacement when a selected set of cutter rolls is thus operatively related to said feed rolls, means located beneath the position of an operatively disposed cutter roll set effective to sever the noodle strips issuing from the latter into desired lengths, and a conveyer means to receive the severed noodle strips and to thereupon discharge the same outwardly of the machine.

4. In a noodle cutting machine, a framework, dough sheet feed rolls mounted in connection with said framework, a power driven drive shaft, transmission means actuated by said drive shaft for operating said feed rolls, a cutter roll carriage slidably supported in connection with said framework, longitudinally spaced sets of cutter rolls of respectively different cutting sizes operatively supported by said carriage and selectively disposable, by moving said carriage, in position to receive and operate upon a dough sheet fed thereto by said feed rolls, each set of cutter rolls comprising a pair of opposed rolls having interlapping annular cutter blade portions, the opposed rolls having intermeshing gears for rotating the same in relatively opposite directions, a cutter roll drive gear adapted to operatively engage the gearing of a cutter roll set disposed to receive a dough sheet fed thereto by said feed rolls, transmission means actuated by said drive shaft for operating said cutter roll drive gear, and releasable means for holding said carriage against displacement when a selected set of cutter rolls is operatively disposed relative to said dough sheet feed rolls and with its gearing operatively engaged by said cutter roll drive gear.

5. In a noodle cutting machine, a framework, dough sheet feed rolls mounted in connection with said framework, a power driven drive shaft, transmission means actuated by said drive shaft for operating said feed rolls, a cutter roll carriage slidably supported in connection with said framework, longitudinally spaced sets of cutter rolls of respectively different cutting sizes operatively supported by said carriage and selectively disposable, by moving said carriage, in position to receive and operate upon a dough sheet fed thereto by said feed rolls, each set of cutter rolls comprising a pair of opposed rolls having interlapping annular cutter blade portions, the opposed rolls having intermeshing gears for rotating the same in relatively opposite directions, a cutter roll drive gear adapted to operatively engage the gearing of a cutter roll set disposed to receive a dough sheet fed thereto by said feed rolls, transmission means actuated by said drive shaft for operating said cutter roll drive gear, releasable means for holding said carriage against displacement when a selected set of cutter rolls is operatively disposed relative to said dough sheet feed rolls and with its gearing operatively engaged by said cutter roll drive gear, means located beneath the position of an operatively disposed cutter roll set effective to sever the noodle strips issuing from the latter into desired lengths, and transmission means actuated by said drive shaft for operating said severing means.

6. In a noodle cutting machine, a framework, dough sheet feed rolls mounted in connection with said framework, a power driven drive shaft, transmission means actuated by said drive shaft for operating said feed rolls, a cutter roll carriage slidably supported in connection with said frame-work, longitudinally spaced sets of cutter rolls of respectively different cutting sizes operatively supported by said carriage and selectively disposable, by moving said carriage, in position to receive and operate upon a dough sheet fed thereto by said feed rolls, each set of cutter rolls comprising a pair of opposed rolls having interlapping annular cutter blade portions, the opposed rolls having intermeshing gears for rotating the same in relatively opposite directions, a cutter roll drive gear adapted to operatively engage the gearing of a cutter roll set disposed to receive a dough sheet fed thereto by said feed rolls, transmission means actuated by said drive shaft for operating said cutter roll drive gear, releasable means for holding said carriage against displacement when a selected set of cutter rolls is operatively disposed relative to said dough sheet feed rolls and with its gearing operatively engaged by said cutter roll drive gear, means located beneath the position of an operatively disposed cutter roll set effective to sever the the noodle strips issuing from the latter into desired lengths, transmission means actuated by said drive shaft for operating said severing means, a conveyer means to receive the severed noodle strips and to thereupon discharge the same outwardly of the machine, and transmission means actuated by said drive shaft for operating said conveyer means.

7. A noodle cutting machine as defined by claim 1, including means to move the cutter roll carriage comprising, a hand wheel equipped manually rotatable shaft, rack bar means affixed to said carriage, and pinion means on said shaft to mesh with said rack bar means.

8. A noodle cutting machine as defined by claim 4, including means to move the cutter roll carriage comprising, a hand wheel equipped manually rotatable shaft, rack bar means affixed to said carriage, and pinion means on said shaft to mesh with said rack bar means.

CONRAD AMBRETTE.